(12) United States Patent
DeLand, Jr. et al.

(10) Patent No.: US 6,431,445 B1
(45) Date of Patent: Aug. 13, 2002

(54) MAGNETIC STRIPE CARD VERIFICATION SYSTEM

(75) Inventors: Robert S. DeLand, Jr., Torrance; Thomas C. McGeary, Manhattan Beach, both of CA (US)

(73) Assignee: Mag-Tek, Inc., Carson, CA (US)

( * ) Notice: Subject to any disclaimer, the term of this patent is extended or adjusted under 35 U.S.C. 154(b) by 0 days.

(21) Appl. No.: 09/549,971

(22) Filed: Apr. 14, 2000

Related U.S. Application Data (63) Continuation-in-part of application No. 09/120,816, filed on Jul. 22, 1998, now Pat. No. 6,098,881.

(51) Int. Cl.[7] ............................................. G06K 7/08

(52) U.S. Cl. ..................... 235/449; 235/493; 235/380

(58) Field of Search ................................. 235/449, 450

(56) References Cited

U.S. PATENT DOCUMENTS

| | | | |
|---|---|---|---|
| 4,423,415 A | 12/1983 | Goldman | 235/454 |
| 4,476,468 A | 10/1984 | Goldman | 235/468 |
| 4,489,318 A | 12/1984 | Goldman | 235/380 |
| 4,546,352 A | 10/1985 | Goldman | 235/487 |
| 4,568,936 A | 2/1986 | Goldman | 235/380 |
| 4,630,845 A | 12/1986 | Sanner | 283/91 |
| 4,635,054 A | 1/1987 | Goldman | 235/487 |
| 4,650,978 A | 3/1987 | Hudson et al. | 235/380 |
| 4,689,477 A | 8/1987 | Goldman | 235/380 |
| 4,748,679 A | 5/1988 | Gold et al. | 382/61 |
| 4,752,837 A | 6/1988 | DeLand, Jr. | 360/51 |
| 4,785,290 A | 11/1988 | Goldman | 156/33 |
| 4,806,740 A * | 2/1989 | Gold et al. | 235/449 |
| 4,807,287 A * | 2/1989 | Tucker et al. | 380/23 |
| 4,837,426 A * | 6/1989 | Pease et al. | 235/440 |
| 4,906,988 A | 3/1990 | Copella | 235/449 |
| 4,916,294 A | 4/1990 | Goldman | 235/449 |
| 4,939,353 A | 7/1990 | Iijima | 235/438 |
| 4,985,614 A | 1/1991 | Pease et al. | 235/440 |
| 5,023,923 A | 6/1991 | Sanner et al. | 382/175 |
| 5,177,344 A | 1/1993 | Pease | 235/449 |
| 5,216,229 A | 6/1993 | Copella et al. | 235/249 |
| 5,235,166 A | 8/1993 | Fernadez | 60/262 |
| 5,298,897 A | 3/1994 | Harrison et al. | 341/71 |
| 5,365,586 A | 11/1994 | Indeck et al. | 713/176 |
| 5,396,369 A | 3/1995 | DeLand, Jr. et al. | 360/2 |
| 5,408,505 A | 4/1995 | Indeck et al. | 360/71 |

(List continued on next page.)

FOREIGN PATENT DOCUMENTS

| | | |
|---|---|---|
| DE | 199 34 228 A1 | 1/2000 |
| EP | 0827101 A2 | 3/1998 |
| JP | 0183791 * | 7/1989 ................. 235/379 |

*Primary Examiner*—Michael G. Lee
*Assistant Examiner*—Ahshik Kim
(74) *Attorney, Agent, or Firm*—Christie, Parker & Hale, LLP (57) ABSTRACT

Magnetic stripe documents are identified and authenticated on the basis of repeatable magnetic characteristics of a stripe recorded with digital data. Stripes are sensed to provide an analog signal, only a portion of which is used, specifically, the portion storing a plurality of zeros. Cyclically, the zeros are sampled and digitized as a target number of samples using a frequency locked loop. The target number of samples for each zero is then reduced by a selection process that attains a predetermined number of digital samples that represent a magnetized portion of a zero, specifically, a space between data transitions. Groups of selected predetermined number of digital samples are then combined to provide a card magnetic characteristic identifier. The harmonic content of the characteristic identifier is tested as a measure of the quality of the stripe sensing. A predetermined level of quality conditions verification. Documents are verified by correlating reference and recent characteristic identifiers. Specific forms of sensor structures are utilized for the applications involving multitudes of different documents and sensor structures.

21 Claims, 8 Drawing Sheets

U.S. PATENT DOCUMENTS

| | | |
|---|---|---|
| 5,428,683 A | 6/1995 | Indeck et al. ............... 713/176 |
| 5,430,279 A | 7/1995 | Fernadez .................... 235/449 |
| 5,434,917 A | 7/1995 | Naccache et al. ............ 380/23 |
| 5,546,462 A | 8/1996 | Indeck et al. ............. 235/493 |
| 5,587,654 A | 12/1996 | Indeck et al. ............... 324/225 |
| 5,602,381 A * | 2/1997 | Hoshino et al. ............ 235/493 |
| 5,612,528 A * | 3/1997 | Green et al. ................ 235/449 |
| 5,616,904 A | 4/1997 | Fernadez .................... 235/449 |
| 5,625,689 A | 4/1997 | Indeck et al. ................ 380/23 |
| 5,627,357 A | 5/1997 | Cheng et al. ............... 235/449 |
| 5,647,003 A | 7/1997 | Pease .......................... 380/59 |
| RE35,599 E | 9/1997 | Pease ......................... 235/449 |
| 5,739,517 A | 4/1998 | Hoshino et al. ............ 235/449 |
| 5,740,244 A | 4/1998 | Indeck et al. ............... 713/176 |
| 5,767,495 A | 6/1998 | DeLand, Jr. ................ 235/449 |
| 5,770,846 A * | 6/1998 | Mos et al. .................. 235/449 |
| 5,829,743 A | 11/1998 | DeLand, Jr. et al. ........ 271/273 |
| 5,988,500 A * | 11/1999 | Litman ....................... 235/450 |
| 6,053,406 A * | 4/2000 | Litman ....................... 235/449 |

\* cited by examiner

MAGNETIC STRIPE CARD VERIFICATION SYSTEM

CROSS-REFERENCE TO RELATED APPLICATION(S)

This application is a Continuation-in-Part of application Ser. No. 09/120,816 filed Jul. 22, 1998, which issued as U.S. Pat. No. 6,098,881.

BACKGROUND AND SUMMARY OF THE INVENTION

Generally, the development relates to systems and processes involving the utilization of repeatable magnetic stripe characteristics to verify magnetic stripe-bearing documents.

Various forms of cards bearing a magnetic stripe (magstripe cards) have long been used for a variety of different purposes. Such cards are currently used in large numbers, for example in the forms of credit cards, debit cards, tickets, passes, I. D. cards and so on. Typically the magnetic stripes of such cards carry recorded data relating to the use of the card, and in some instances relating to the assigned user or owner of the card.

Although magnetic stripe cards are widely and successfully used in commerce and industry, counterfeiting and modification of cards (along with other forms of documents) are common occurrences. The resulting losses are great. Consequently, a continuing need exists for a practical system and method to reliably verify the authenticity of documents generally, and specifically of magnetic stripe cards. That is, a substantial need exists for techniques and apparatus to reliably determine whether a presented magstripe card or other document is authentic.

Over the years, there have been numerous proposals for verifying documents, including the authenticity of magnetic stripe cards. A substantial number of prior proposals have been based on a concept of using certain magnetic characteristics of the magnetic stripe to identify cards. In that regard, it has been determined that generally, the magnetic stripes of individual cards possess inherent, substantially unique, magnetic characteristics that can be repeatedly sensed. Over the years, these characteristics sometimes have been recognized as contributing a noise component to sensed signals. Thus, along with the signal component representing recorded data, a repeatable noise signal component also appears. Just as the magnetic characteristics of individual stripes are distinct, noise signals are somewhat unique among cards. Accordingly, it has been proposed to employ such magnetic characteristics and the resulting signals as a basis for identifying individual magnetic stripe cards. Generally, note that in sensing magnetic stripes, the length of a magstripe translates into a time scale for the sensed signal. Thus, specific portions of the sensed signal represent specific areas of the magstripe.

In general, a variety of verification techniques and structures, based on the noise or characteristic component of a sensed magstripe signal have been proposed. In some instances, the general technique has been compared to the science of human fingerprinting, that is, involving the use of representations of a somewhat unique physical characteristic for purposes of identification.

One prior magstripe identification proposal involved using a separate non-data magnetic stripe placed on a document specifically for purposes of identifying the document. Other proposals have included various treatments involving the signals that are variously recorded conditioned and sensed from magnetic stripes.

Typically, the magstripes on conventional magstripe cards are divided into parallel tracks that are separately recorded. Many of the prior proposals for document authentication have involved the techniques for recording a track of the magnetic stripe with digital data to provide representative magnetic transitions along the length of the magnetic stripe. Signals sensed from the magnetic transitions, or other portions of the signal were then proposed for characterizing a card or other document. For example, the characteristics of peaks in the sensed magnetic signal (representing magnetic transitions) has been proposed to be used for identifying documents bearing a magnetic stripe.

Other proposals have suggested using other portions of the sensed magstripe signal from one of the tracks. For example, the relatively flat signal portions representative of magnetized regions of the stripe that are located between magnetic transitions have been proposed for use.

Various techniques also have been proposed for attaining more consistent results in sensing characteristic signals, for example: averaging the results of multiple sensings, oversampling (increased sampling as by a factor of one hundred), and using a phase locked loop to control sampling. It also has been opined that for identification purposes, sizable variations are acceptable between individual sensings of magstripe characteristics.

In spite of the various structures and techniques proposed for magstripe fingerprinting, the concept has not gained widespread acceptance. That is, using the remanent noise in the signal sensed from magstripes to verify individual documents has not come into widespread use. Rather, although numerous proposals have been suggested for using the magnetic noise to characterize documents, the technique simply has not gained significant commercial or industrial acceptance.

In general, the system of the present invention is based on recognizing the various problems of using the repeatable characteristics of a magstripe for purposes of document identification, for example in broad commercial and industrial applications. In that regard, many problems arise in the industrial and commercial arenas which are not apparent in the laboratory. Several of those problems are distinctly associated with the plastic magstripe cards typically used as bank transaction cards.

One major consideration relating to the extensive use of magnetic characteristics for card recognition involves the number of cards in a system as well as the number of sensors and the number of persons using the sensors. For example, a typical commercial system must readily accommodate many thousands of individual cards (assigned to different users) used randomly in combination with hundreds, if not thousands, of individual processing units.

Furthermore, in extensive systems, reliability becomes exceedingly important, particularly in the realms of financial and security transactions, as are involved with bank cards. Accordingly, accuracy has been found to be critical in the successful operation of such systems.

In general, the system of the present invention involves improvements that enable magnetic characteristic verification techniques to operate successfully in the realms of widespread commercial and industrial applications. Specifically, the processes and systems of the present invention are directed to improved structures and methods for sensing magnetic stripe cards and to improved processes for consistently obtaining and processing specific magnetic stripe characteristic features as well as developing a magnetic stripe identification characteristic from such features.

In accordance with an embodiment of the present system, implementing processes hereof, repeatable magnetic characteristic signals (resulting from specific characteristic features of the magstripe) are selected from defined areas of a digitally-recorded magnetic stripe. The defined areas are located between magnetic data transitions. Such defined areas of the stripe may be magnetized to a level of saturation and accordingly produce relatively flat (stable) sections in the sensed signal. Although these signal sections are relatively flat, they still manifest a low level signal (noise) representative of the repeatable magnetic characteristics or features of the stripe. Thus, these signal sections can be used to truly identify each magnetic stripe in a manner somewhat analogous to a fingerprint.

In accordance herewith, after sensing a magstripe to produce a magnetic analog signal, a target number of samples from several relatively flat sections of the signal are selected using a frequency lock loop. The set or group of individual samples are selectively processed to obtain a predetermined subset of samples. The predetermined subset of digitized samples is then further processed by offset selection to accomplish a sub-subset of digitized samples that become a component of a magnetic characteristic designation. That is, several sub-subsets of digitized samples are combined to form a magnetic designation or identifier for the magstripe-bearing card.

Essentially, in the context of using the identifier for identification, the propriety of sensing operations is verified. Note that distorted or improper signals may result from various irregularities in the configuration, movement or path of the card in relation to the sensor. Accordingly, the quality of sensing or quality of swipe, may not be adequate for accurately characterizing the card. In the disclosed embodiment, for example, an aspect of signals sensed from magnetic stripes is tested for conformation as manifesting sufficient quality of sensing to characterize the magnetic stripe. In the disclosed embodiment, harmonic data is used to effectively measure the quality of sensing to verify the identifier. With the characteristic identifier for a card verified, it can be tested by correlation to indicate the authenticity of the card.

In view of the relatively small amplitude of the magnetic characteristic signal component, distorted and spuriously generated signals can present a significant problem. In that regard, card offsets and other swipe deviations can distort the sensed signal with particularly serious variations in the magnetic characteristic signal component. Thus, in accordance herewith, a measure of quality is performed for the sensing to verify a level of adequacy.

Another source of spurious signals has been identified that results from the typical form and structure of contemporary magnetic transducer heads. Consequently, an improved head is disclosed in accordance herewith to reduce certain troublesome spurious signal components in the magstripe analog signal.

BRIEF DESCRIPTION OF THE DRAWINGS

In the drawings, which constitute a part of this specification, exemplary embodiments exhibiting various objectives and features hereof are set forth, specifically.

DETAILED DESCRIPTION OF THE ILLUSTRATIVE EMBODIMENTS

As is required, detailed illustrative embodiments of the present invention are disclosed herein. However, physical magnetic systems, data recording formats, and operating structures in accordance with the present invention may be embodied in a wide variety of different forms, some of which may be quite distinct from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
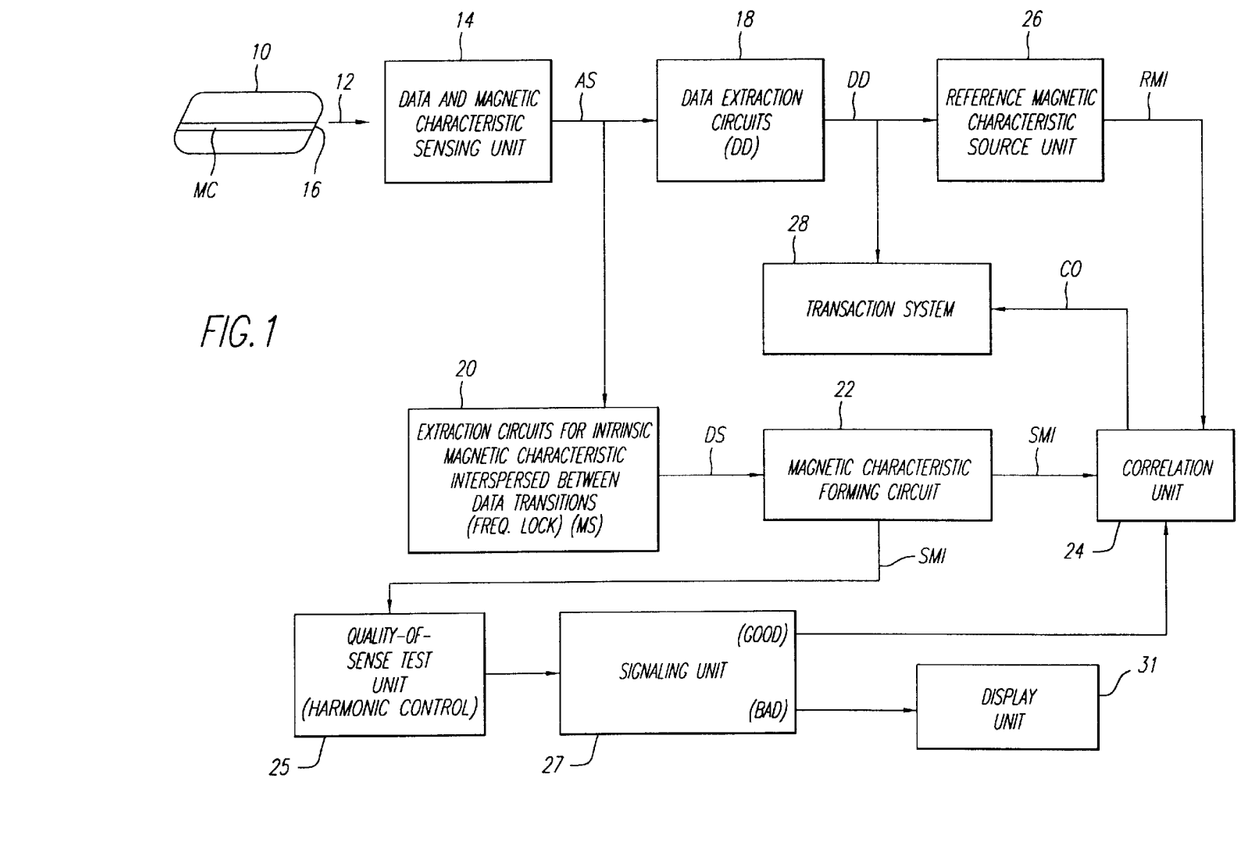
FIG. 1 is a block diagram of a system constructed in accordance with the present invention.

Referring initially to FIG. 1, a magnetic stripe card 10 is represented (upper left) and as indicated by an arrow 12, is used by entry into a sensing unit 14. Generally, the unit 14 comprises a magnetic read unit for sensing a magnetic stripe 16 on the card 10, to provide an analog signal containing components of both recorded digital data and a repeatable magnetic characteristic of the stripe 16.

Considering the sensing of the card, it is to be understood, with repeated sensings, even though data may be changed, the magnetic characteristic can be sensed as a repeatable component in the analog signal. As indicated above, the characteristic signal has traditionally been considered noise. However it is a characteristic feature of the magnetic stripe 16 and in accordance herewith serves as the basis to individually identify the card 10.

The magnetic stripe card 10, exemplifying a document herein, may take the form of a conventional bank card comprising a wallet-sized sheet of plastic bearing the magnetic stripe 16, adapted to be digitally recorded. Traditionally, in the exemplary form, the card 10 is embossed to indicate the holder's name, account number and so on. Of course, the system of the present invention may be employed in cooperation with various forms of magnetic stripe cards or other documents.

As indicated above, the magnetic stripe 16 possesses a repeatable magnetic characteristic MC. That characteristic contributes to a sensed analog signal AS (FIG. 1 treated below) along with a data signal component DD. Note again that the magnetic characteristic component signal MS (not shown in FIG. 1), as detailed below, often is considered noise in relation to the sensed digital data signal DD.

Two component signals DD and an intermediate signal DS are separately extracted from the analog signal AS by a pair of extraction circuits 18 and 20 respectively. The digital data signal DD is provided to a unit 26 and a system 28 for further processing as described below. Concurrently, the extraction circuits 20 extract the intermediate signal DS. Specifically, the analog signal AS is sampled and digitized to accomplish a series of digital words, or digitized samples DS (FIG. 1), that include representations of the magnetic characteristic MC.

As explained in greater detail below, the digitized samples DS are processed in accordance herewith, ultimately to accomplish a magnetic characteristic identifier MI representative of the characteristic MC, which is sufficiently consistent for reliable use in an extensive system involving a multitude of cards. The digital samples DS may comprise words of various bit length, e.g., one to five bits and are processed by a forming circuit 22 to provide the actual magnetic characteristic identifier MI, signals representative of which (sensed-SMI and reference RMI) are applied to a correlation circuit 24. In one operating embodiment, two-bit words appear quite satisfactory.

As mentioned above, based on a realization of the significance of card reading deviations, an aspect of the present invention involves testing or measuring the quality of the card sensing. In that regard, before using a sensed identifier SMI, it is verified by application to a quality-of-read test unit 25. The test results are carried by a representative signal to a signaling unit 27 having alternate "good" and "bad" binary outputs applied respectfully to the correlation unit 24 and a display unit 31.

As suggested, to perform comparisons, the correlation circuit 24 (center right) also receives a reference form of the magnetic characteristic identifier RMI from a source unit 26. In various applications, the reference source unit 26 may take a variety of different forms. For example, the magnetic characteristic identifier could be recorded on the card 10; however, in a currently preferred embodiment hereof, the reference unit 26 accesses a data bank to provide a magnetic characteristic reference identifier RMI (previously formed) for correlation with a freshly sensed identifier SMI.

If qualified by a "good" signal, the correlation circuit 24 provides a correlation signal CO to the transaction system 28. Of course, a high degree of correlation verifies the authenticity of the card 10. Note that the transaction system 28 may incorporate offsite components and furthermore may incorporate or overlap apparatus involving the source unit 26. For example, the transaction system 28 may be integral with the reference unit 26 comprising a structure for addressing a data bank with a card user's account number. As a consequence, the data bank provides a reference magnetic characteristic identifier RMI for comparison with the sensed magnetic characteristic identifier SMI. Also note that the characteristic identifier MI can be combined with other identifiers, e.g. PIN, PAN, etc. to combat fraud by various comparisons.

The transaction system 28 may embody various operating equipments or systems, e.g. an automatic teller machine, an entry or access control, a card verification unit, and so on. Generally, the digital data signal DD is also processed and variously utilized by the transaction system 28.

As explained above, in the disclosed embodiment, an aspect of the sensed signal is tested for conformation with a property sensed signal. Accordingly, deviate sensings are detected and a repeat sensing of the card is instructed. As a consequence, deviate card sensings, which adversely distort the sensed magnetic characteristic identifier SMI, are rejected in favor of a good-quality card sensing.

If, for example, the card 10 (FIG. 1) is improperly held or moved through the sensing unit 14 the characteristic identifier MI may be distorted beyond recognition. Note that sensings that are completely satisfactory for data use often have been determined un-usable for providing the magnetic characteristic data, e.g., the identifier MI.

Essentially, an aspect of the present invention is based on recognizing the criticality of the sensing, and the fact that bad sensings can be recognized. Criteria for measuring the quality of sensing are several and include: noise levels, signal energy, amplitude variations and harmonic content. In the disclosed embodiment, the harmonic content of signals within predetermined frequency bands is the test criteria as disclosed in detail below. The test criteria is applied to the magnetic characteristic identifier MI, serving as an aspect of the analog signal AS. Of course other aspects can be used including the actual analog signal AS.

In the event of a bad sensing, the signaling unit 27 provides a "BAD" output to the display unit 31 which advises the user to sweep or sense the card again, as by reinsertion. The process continues until a "GOOD" sensing is accomplished or the card is rejected as defective.

It is noteworthy that in a system context, as depicted in FIG. 1, distinct components appear primarily in: the read unit 14, the extraction circuits 20, the magnetic characteristic forming circuit 22 and the units 25 and 27. Details of these structures are treated below; however, preliminarily, some functional operations will be considered with reference to the graphic representations beginning with FIG. 2.

Figure 2:
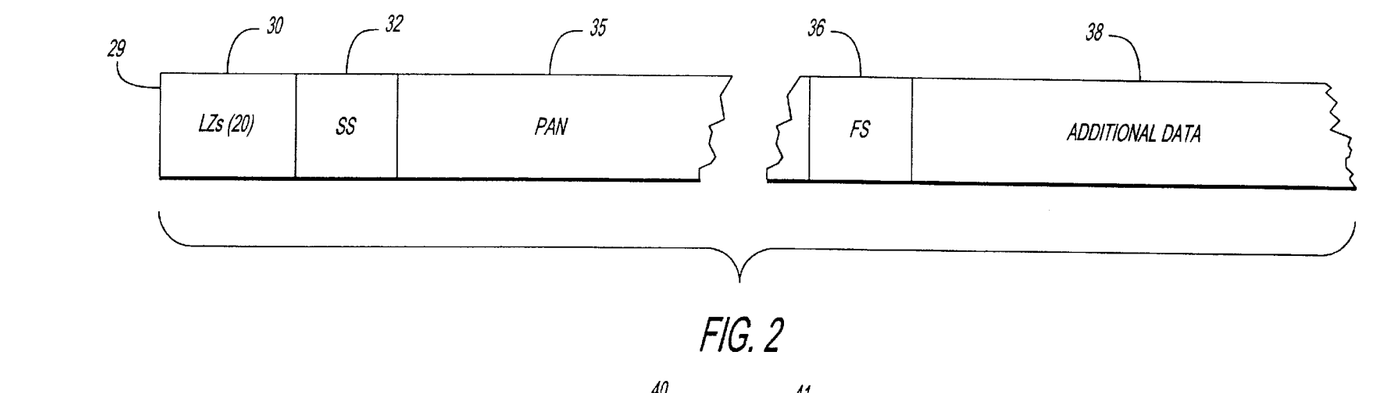
FIG. 2 is a graphic representation of a portion of a data record on magnetic stripe track as shown in FIG. 1 and used in accordance herewith.

A typical format for a track 29 of the magnetic stripe 16 is fragmentarily illustrated in FIG. 2 (not to scale). Initially, a section 30 stores a plurality of zeros (e.g., approximately twenty leading zeros) designated LZs. As disclosed herein, the magnetic characteristic signal MS sensed from the zeros 30 is used to develop the characteristic identifier M1. The uniform digital recording of the leading zeros is desirable in that regard.

Next in the fragmentary track format of FIG. 2, a section 32 carries a start sentinel SS. Thereafter, a section 35, stores a primary account number PAN for the assigned card user. The next section 36 stores a field separator FS which is followed by a section 38 for storing various additional data AD. These encoding elements are well-known and are defined by the International Standards Organization. However, as shown, they are merely illustrative and any of a wide variety of formats may be employed in systems of the present development.

Figure 3:
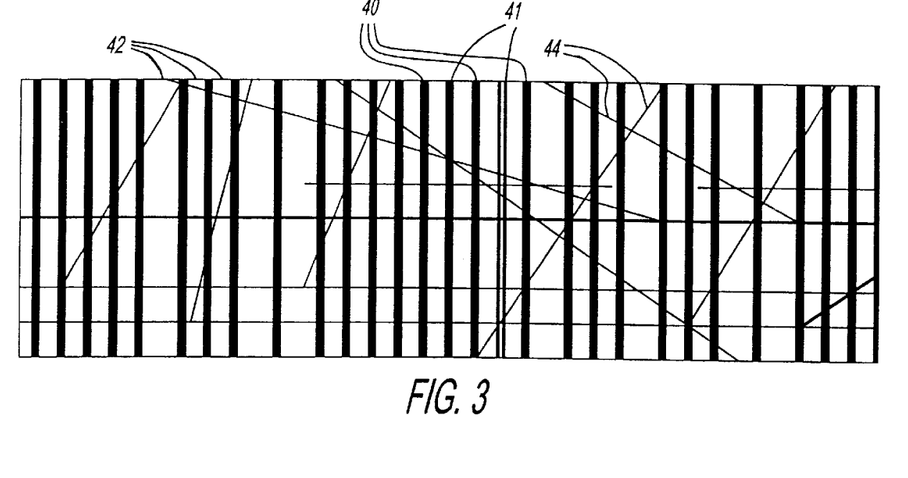
FIG. 3 is a grossly-enlarged pictorial of a magnetic data pattern showing a small portion of a stripe track as illustrated in FIG. 2.

In relation to the digital data recorded on the stripe 16 (FIG. 1), for example in the track 29 (FIG. 2), devices are well-known for actually viewing the magnetic configuration including the digital recording pattern. Magnetized regions are clearly visible separated by magnetic transitions. Such a view is represented in FIG. 3 with individual magnetic transitions 40 and 41 appearing between magnetized regions 42. Note that scratches 44 also appear in the view.

In accordance herewith, it is important to understand that magnetic characterizations MS are sensed from the magnetized regions 42 of the track. When sensed, these regions 42 generate signals that are relatively flat as described below in greater detail. That is, the regions 42 translate into flat, or stable signal sections, in comparison with other portions of the signal AS, also as will be treated below.

Figure 4A:
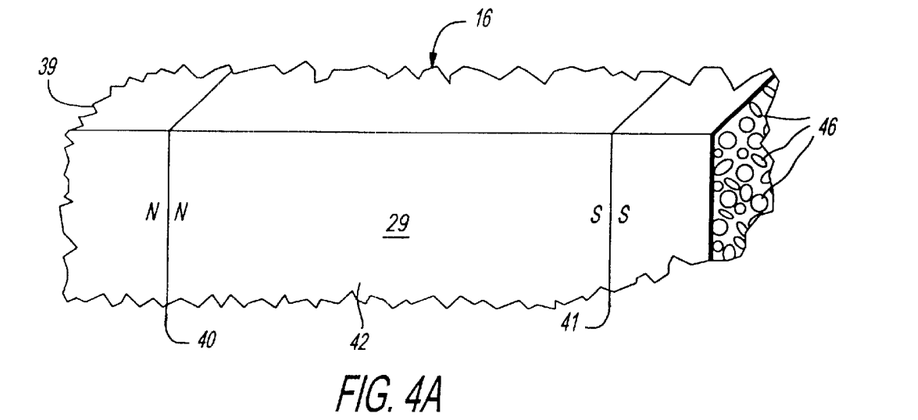
FIG. 4 shows a related set of graphic representations involving a small portion of a track as illustrated in FIG. 2.
Figure 4B:
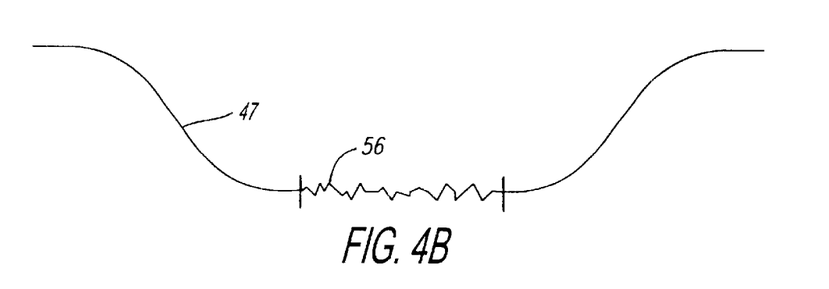

To consider the track 29 in greater detail, along with its produced analog signal AS, reference now will be made to FIG. 4. Specifically, FIG. 4A shows a grossly enlarged fragment 39 of the magnetic stripe track 29. A pair of magnetic transitions 40 and 41 (representing data) are sharply represented defining a magnetized region 42 between them. Incidentally, individual magnetic particles 46 also are indicated in the cross section (right). As has generally been recognized in the past, it is the inherent variations of these particles 46 that account for the magnetic character (fingerprint) of the stripe 16 of which the track 29 is a part.

Figure 4C:
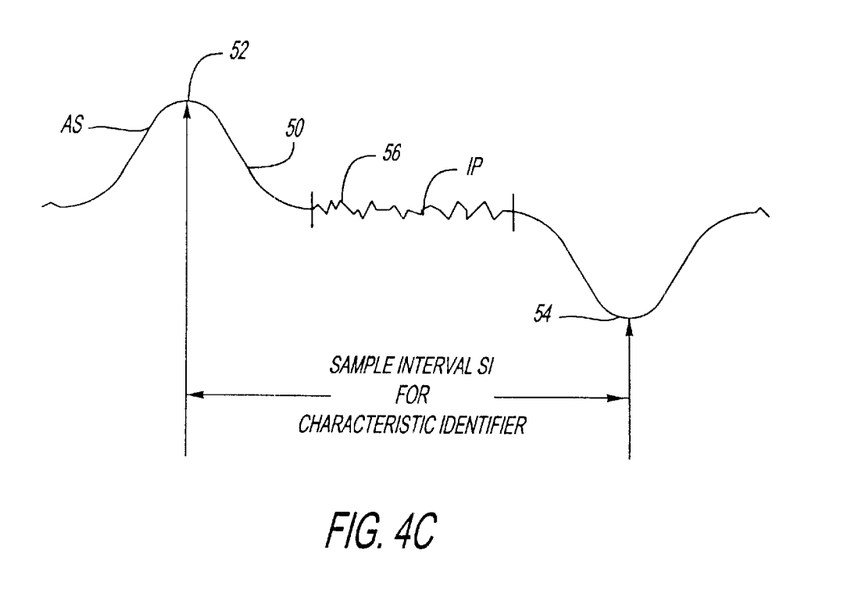

Immediately below the fragment 39 (FIG. 4A) is a plot 47 (FIG. 4B) of the fragment 39, showing magnetization (ordinate) versus displacement along the length of the fragment 39. Generally, the plot 47 indicates the region 42 of the fragment 39 to be magnetized to a saturation level showing enhanced noise at a portion 56. Note that the plot 47 is somewhat idealized, as is the waveform 50 of FIG. 4C representative of the analog signal AS sensed from the fragment 39.

The waveform 50 clearly indicates the magnetic transitions 40 and 41 (recorded data) with positive and negative going pulses 52 and 54 respectively. The interspersed, magnetized region 42 (FIG. 4A) of the fragment 39 is represented by a relatively stable or flat section including the portion 56 (FIG. 4C) of the waveform 50 also illustrating the noise. Thus, in the waveform 50, the signal content of the portions 56 (and similar portions) indicate the magnetic characteristic that is used in accordance herewith. That is, the magnetic characteristic identifier MI, as ultimately developed, is taken from the relatively flat portions 56, (termed interspersed portions IP) residing in the plurality of zeros, such as, for example the leading zeros section 30 (FIG. 2) of the magnetic track 29. That is, the magnetic characteristic identifier MI is made up of signals from several of the last interspersed portions IP of the signal AS sensed from these zeros. The selected portions are sampled, digitized, processed and combined to produce the desired magnetic characteristic identifier MI, all as treated in detail below.

The magnetic characteristic signal component MS from the interspersed portions 56 (FIG. 4C) of the waveform 50 may be variously represented, or extracted from the analog signal AS using a variety of different techniques. However, as disclosed in detail below, the analog signal AS initially is sampled and digitized.

As a basis for an interval of sampling, peaks of the pulses 52 and 54 (waveform 50) are detected. Specifically, as illustrated in FIG. 4C, a sampling interval SI is defined between peaks in the pulses 52 and 54 of the waveform 50.

Figure 5:
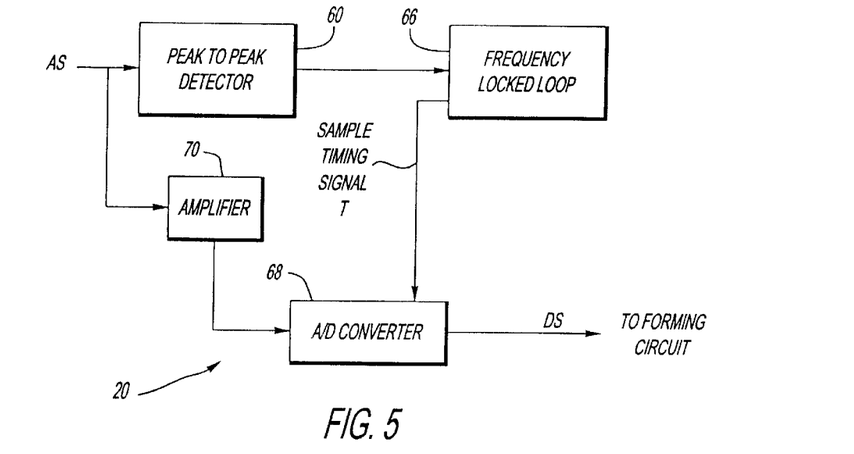
FIG. 5 is a block diagram indicating one form of characteristic extraction circuit as may be utilized in the system of FIG. 1.

The sampling operation is performed by the extraction circuits 20 (FIG. 1) an illustrative form of which is shown in FIG. 5. The operation of the circuits 20 (FIG. 5) now will be considered with concurrent reference to FIG. 6 illustrating the process steps. Note that as is generally the case herein, with respect to FIG. 6, to illustrate the process, curves are somewhat idealized and are not drawn to scale. In that regard, note also that the scale of FIG. 6 is grossly enlarged with respect to the curves of FIG. 4. Also, for purposes of illustration, the curves of FIG. 6 are shown with breaks (interruptions) to simplify the representations for explanation.

Referring to FIG. 5, the analog signal AS is applied to a peak-to-peak detector 60. Such circuits are well-known and function to define intervals between individual peaks in the analog signal AS (FIG. 4C). Accordingly, the peak detector provides binary signals 62 (FIG. 6A) defining each sampling interval SI. The analog signal AS as illustrated by a waveform 64 in FIG. 6B, is fragmentarily represented with breaks for purposes of simplifying the drawing to enable understanding.

Figure 6A:
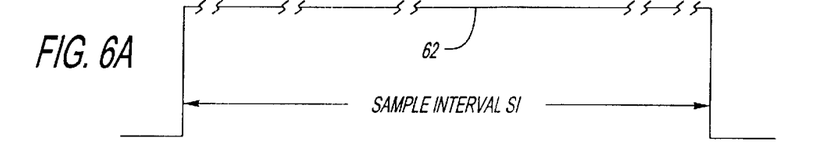
FIG. 6 is a series of graphic representations relating to a tiny fragment of a representative signal from a magnetic stripe track recorded as illustrated by FIG. 4.
Figure 6B:
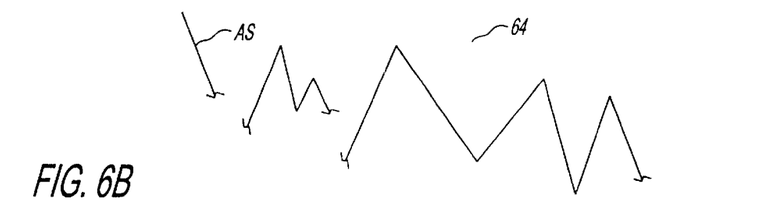
Figure 6C:
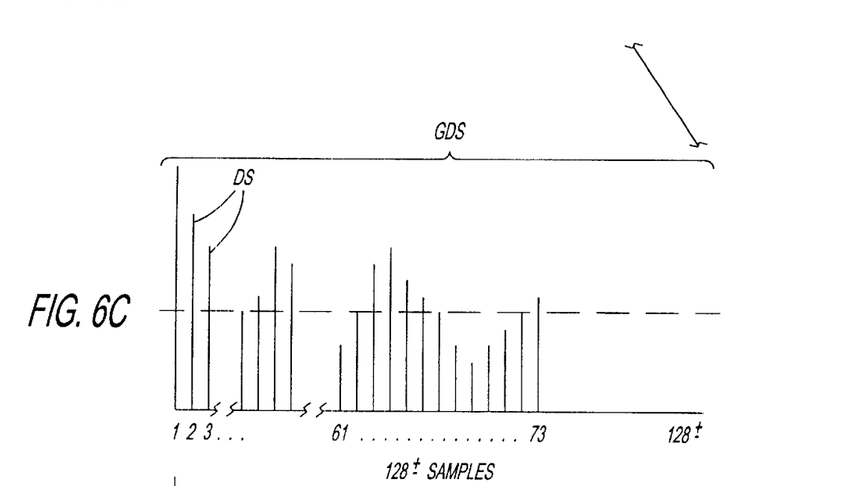

During each defined peak-to-peak or sample interval SI (FIG. 6A), the analog signal AS (FIG. 6B, represented by the curve 64) is sampled to provide approximately one hundred twenty-eight individual samples DS (FIG. 6C). The individual samples are accomplished by a frequency locked loop 66 incorporating an oscillator (not shown). Forms of such circuits are well-known to monitor a series of intervals with the objective of defining a pre-determined number of cycles during each interval. In the illustrative system, the frequency lock loop has a target of one hundred twenty-eight cycles or samples in each sample interval SI (FIG. 6A). Thus, approximately one hundred twenty-eight samples are supplied from the loop 66 (FIG. 5) to an analog-to-digital converter 68 during each sampling interval SI. System and medium variations account for variations in the actual number of samples accomplished.

The converter 68 (FIG. 5) converts each sample (analog) to a digital form, for example, defined by some number of binary bits, e.g. two, as explained above. Though converted to a digital form, the samples DS are illustrated as vertical bars in FIG. 6C. That is, the analog signal AS is provided through and amplifier 70 to the converter 68 which accomplishes individual digitized samples DS. Signals representative of the digitized samples DS are supplied from the extraction circuit 20 (FIG. 1) to the magnetic characteristic forming circuit 22.

As suggested above, due to inherent variables in the system, the number of samples actually taken frequently will vary from the target number. During one sampling interval SI, or cycle of operation, one hundred twenty-nine samples might be taken, while one hundred twenty-six samples might be taken during another defined sampling interval SI.

In accordance herewith, in forming the magnetic characteristic identifier MI, it has been found important to consistently utilize a predetermined number of digitized samples for each sampling interval SI. To accomplish a uniform number of samples for each sampling interval, a re-sizing operation is performed to produce a subset of a predetermined number of samples. The re-sizing operation is performed in the characteristic forming circuit 22 (FIG. 1) as will be considered below. However, preliminarily, some recapitulation and further graphic considerations are provided.

In the disclosed embodiment, with reference to FIG. 2, samples for the magnetic characteristic identifier MI are taken from the last eight interspersed portions of the leading-zeros section 30 of the track 29. Specifically, in the disclosed embodiment, the samples are taken from the eight interspersed portions 56 (FIG. 4B) of the analog signal AS. These signal portions represent the magnetized regions 42 (FIG. 4A) of the track 29 located between data transitions, as transitions 40 and 41 in the leading zeros section.

Recapitulating, in the disclosed embodiment, samples are used from the last eight sequential interspersed portions of the analog signal AS representing leading zeros. Specifically, the last eight portions 56 (FIG. 4C) from the leading-zeros section 30 (FIG. 2) are used. Note that FIGS. 4 and 6 represent a single sampling interval SI, including an interspersed portion. Accordingly, as explained in detail below, the last eight portions (from the leading-zeros section 30) are stored in the forming circuit 28 (FIG. 1) and processed to accomplish a series of binary word values that are then combined to form the magnetic characteristic identifier MI. However, as described above, before using the identifier MI as represented preliminarily it is preliminarily tested to verify that a sufficiently proper sensing of the magnetic stripe 16 (FIG. 1) has been accomplished.

As explained above, the extraction circuits 20 (FIG. 1) provides sets of digitized samples DS to the forming circuit 22. Each set is taken from an interspersed portion (between magnetic transitions representative of digital data) of the analog signal AS accomplished by the structure treated above with reference to FIG. 5. The sets of digitized samples are then processed by the forming circuit 22 which will now be considered in detail with reference to FIG. 7, and the graphic representations of FIG. 6.

Figure 7:
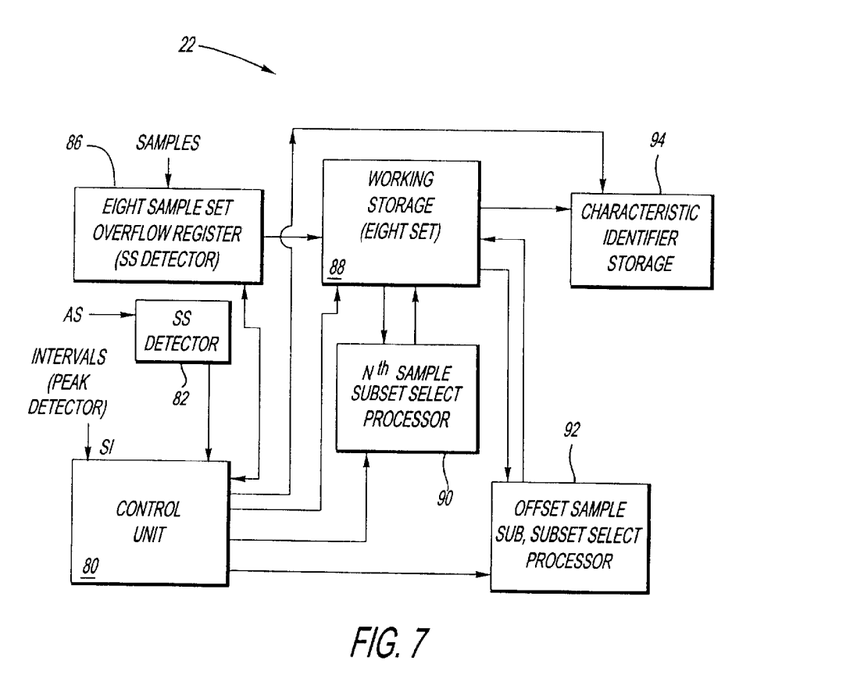
FIG. 7 is a block diagram indicating one form of characteristic forming circuit as may be utilized in the system of FIG. 1.

The forming circuit 22 as shown in detail in FIG. 7 includes a control unit 80 coupled to receive sample interval signals SI along with a signal from a detector 82 which in turn receives the analog signal AS. In operation, the detector 82 senses a signal representative of the sentinel SS (FIG. 2) indicating the end of the leading zeros. The end of the leading zero, portion 30 (FIG. 2) is thus indicated to the control unit 20.

The sampling interval SI is indicated by the similarly named signals represented by the waveform 62 (FIG. 6A). Accordingly, the control unit 80 controls the forming operation defining the digitized samples DS into sets that occur during each sample interval SI of the leading-zero section.

The control unit 80 (FIG. 7) is connected to a register 86 which receives sets of digitized samples DS from the analog-digital converter 68 (FIG. 5). The register 86 (FIG. 7) is basically an overflow register, which in the illustrative embodiment retains only the last eight sets of received digitized samples DS. Accordingly, the system retains for processing the last eight sets of digitized samples DS for processing. In that regard, at the conclusion of the leading zeros LZs (FIG. 2), the stored eight sets of digitized samples DS are bulk transferred from the register 86 (FIG. 7) to a working storage 88 for processing under control of the control unit 80.

The working storage 88 is connected to interface with an Nth sample processor 90 and an offset processor 92. The processors 90 and 92 are also connected to the control unit 80.

Essentially, sets of digitized samples DS (FIG. 6C) are first processed by the processor 90 (FIG. 7) to provide a reduced subset consistently including a predetermined number of digitized samples. After the selection operation of the processor 90, the resulting subsets of digitized samples are further reduced to sub-subsets by the processor 92. The second reduction limits samples to those well in the section 56 of the sampling interval SI (FIG. 6A). The details of these operations are treated below; however, essentially each set of digitized samples DS is reduced to a specific-number sub-subset of samples in accordance herewith to provide a component for the magnetic characteristic identifier MI. The sub-subsets of digitized samples DS are cumulated in the characteristic identifier storage 94.

It is to be noted that certain elements of the forming circuit as shown in FIG. 7 have been separately shown merely for purposes of illustration. In an operating system, these elements might be incorporated or combined, for example in a transaction system, somewhat expanded from the transaction system 28 (FIG. 1). Of course a wide variety of different processing techniques may be utilized in accordance herewith to accomplish the process as explained in greater detail below with reference to a logic flowchart. Note that the operations involve: digitizing an approximate number of samples for several sample intervals, re-sizing those sets of samples to subsets of a specific number, further selecting sub-subsets of a specific number, taken from the flat portions of the analog signal.

To accommodate a specific example, certain numbers have been used from a successful embodiment. Specifically, for example, a set GDS of digital samples DS from one sampling interval SI constitutes approximately one hundred twenty-eight individual samples. A specific-number subset SDS (FIG. 6D) of digital samples DS constitutes sixty-four selected samples DS. A sub-subset SSDS (FIG. 6E) constitutes twenty-four digital samples. For purposes of explanation, individual digitized samples DS (FIG. 6C) are assigned numbers one through one hundred twenty-eight and are represented by analog lines.

In view of the above explanations, the complete process for generating a magnetic characteristic identifier MI now will be treated with reference to several of the individual figures. Accordingly, assume the presence of a magnetic stripe card 10 (FIG. 1) bearing a magnetic stripe 16 which carries a recorded track 29 (FIG. 2) in the form of magnetic transitions and initiated with a section 30 bearing a series of leading zeros LZs.

The unit 14 (FIG. 1) senses the leading zeros in the form of an analog signal AS (FIG. 4C) which is applied to data extraction circuits 18 (FIG. 1) and extraction circuits 20 for the magnetic characteristic. The data extraction circuits 18 may take a conventional form functioning to extract the digital data of the track 29. Such data includes representations for accessing a memory by operation of the unit 26 to provide a reference magnetic characteristic identification RMI. The use of the reference identifier MRI in a verification test is treated in detail below.

Consider now the operation of the extraction circuits 20 with respect to the analog signal AS. In that regard, note that the magnetic characteristic data of concern herein is contained in the leading-zeros section 30 (FIG. 2) of the track 29. Consequently, with the track 29 sensed (indicated by a block 100 FIG. 8 upper left) to provide the analog signal AS, the signal is then sampled and digitized as explained with reference to FIGS. 5 and 6 to accomplish sequential sets GDS of digitized samples DS during sampling intervals SI. The operation is represented by a block 102 in FIG. 8 and is graphically illustrated for a single sampling interval SI in FIGS. 6B and 6C. That is, the operation to provide sets GDS of digitized samples DS is accomplished by the structure of FIG. 5 as explained above.

The sets GDS (FIG. 6C) of digitized samples DS are provided from the extraction circuits 20 (FIG. 1) to the forming circuit 22 illustrated by FIG. 7 and explained in detail above. Essentially, the forming circuit 22 isolates the last eight sets GDS from the leading-zeros section 30 (FIG. 2) providing representative digitized signals in storage for processing as represented by the block 104. Thus, eight sets GDS of samples DS (FIG. 6C) designated "1" through "128" are contained in working storage 88 (FIG. 7) for processing.

The forming process for each set GDS of digitized samples DS involves two distinct selection steps. The first step involves attaining a subset SDS of precise number of digitized samples DS, e.g., a subset of 64 digitized samples. This operation is performed because even though the sampling intervals are controlled by a frequency lock loop, in the operating environment, the number of samples taken during a sample interval may vary, e.g. potentially including either a few additional samples or a few less samples. Re-sizing to obtain a specific number of samples has been determined to be somewhat critical for certain applications.

With the accomplishment of a subset SDS of a predetermined number of samples, e.g. further selection is performed to isolate the selected samples from the relatively flat portion 56 (FIG. 4C) of the analog signal. As explained above, it is important to utilize samples from the magnetized regions 42 (FIG. 4A) of the stripe 16.

With the eight sets GDS of digitized samples DS stored (FIG. 7 working storage 88) consider now the logic steps of the subset processor 90 to accomplish precisely sixty-four digitized samples DS as a component for the magnetic characteristic identifier MI. Accordingly, assume a set GDS of digitized samples DS is identified for processing as indicated by the block 106 of FIG. 8.

Figure 8:
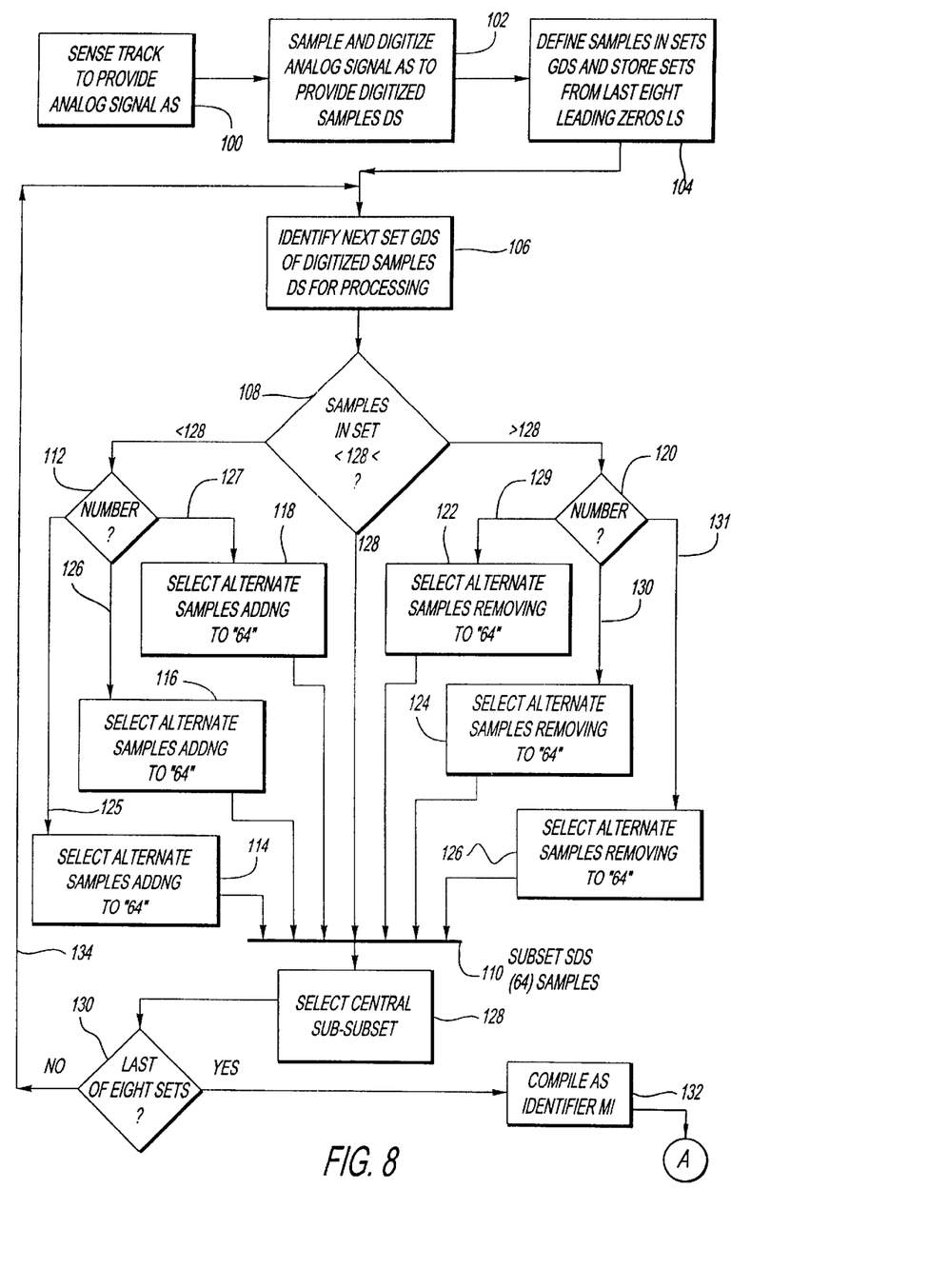
FIG. 8 is a flow diagram illustrating an exemplary process of the present invention as may be used in the system of FIG. 1.

The processor 90 (FIG. 7) accomplishes the selection of the subset SDS and may be implemented in accordance with the logic of FIG. 8. Considering the exemplary logic, an initial query, block 108 (FIG. 8, upper right) indicates three possibilities with respect to the sampled set GDS, specifically the number of digitized samples DS might: (1) equal the target of one hundred twenty-eight, (2) be more than the target or, (3) be less.

If the target number of one hundred twenty-eight was accomplished, the process proceeds to a junction 110 (FIG. 8, lower center) from which subsequent steps are discussed below. However, if the number of actual digitized samples in the set GDS is less than one hundred twenty-eight, the process proceeds to a query block 112 allowing three different possibilities, i.e., samples numbering: one hundred twenty-five, one hundred twenty-six or one hundred twenty-seven. Of course greater numbers of displacement from the target also can be accommodated; however, for purposes of illustration variations of up to "three" samples DS are treated.

Assume that deviating from the target number of one hundred twenty-eight samples DS, the actual number of samples DS in the set GDS is one hundred twenty-five. In that event, the process proceeds to a step as illustrated by a block 114.

Figure 6D:
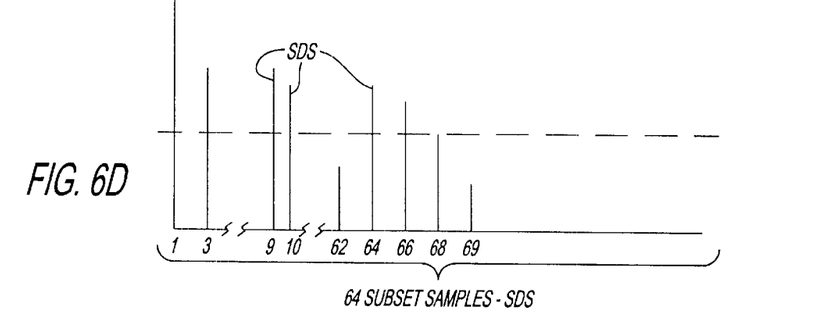

The operation represented by the block 114 is illustrated graphically to some extent in FIG. 6D. Basically, alternative samples are dropped, with certain added exceptions to attain the predetermined number, e.g. sixty-four.

The alternate (second) selection is effective; however, in adding or deleting samples at distributed locations, the sequence shifts between alternate odd and alternate even samples. To illustrate, assume a set of fourteen samples and a need for a subset of eight samples. If odd samples are initially selected, a switch to even alternate samples is made with the addition. Specifically, the underscored samples are selected as eight.

To add: 1 2 3 4 5 6 7 8 9 10 11 12 13 14.

To remove samples a similar alternate selection is employed. For example, to obtain a subset of eight samples from a set of seventeen the pattern might be as follows:

1 2 3 4 5 6 7 8 9 10 11 12 13 14 15 16 17.

Thus, alternate selection is performed with added or removed samples at distributed locations to attain the desired number of samples in the subset SDS. Thus, as represented by the block 114 (FIG. 8) alternate samples are taken with additions to accomplish a subset SDS of exactly sixty-four digitized samples. With such a subset, the operation proceeds to the junction 110, again to be treated subsequently.

In the event that the set GDS of digitized samples DS constituted one hundred twenty-six samples, the process proceeds to a step represented by a block 116. Here, the process again involves selecting alternate samples DS along with additional samples to accomplish the desired subset, e.g. sixty-four.

Similarly, if one hundred twenty-seven samples were attained, the process proceeds to a step illustrated by a block 118 indicating an alternate selection, again adding to attain sixty-four. Thus, by using spaced-apart or distributed normally-rejected samples to supplement the selected samples, a subset SDS of a precise number is accomplished by the processor 90.

As indicated above, the actual number of samples DS in a set GDS also may exceed the target number of samples. In that event, the process proceeds to a query block 120 (FIG. 8 upper right) indicating a step of identifying whether the excessive number of samples is one, two or three. If one excess sample exists, the operation proceeds to a step of block 122 which involves selecting alternate samples DS and removing to attain the desired sixty-four. Thus, a precise subset of "64" samples is attained and the operation proceeds to the junction 110.

Similar deletions occur in the event of two or three excess samples as represented by the blocks 124 and 126. Accordingly, in such events samples are dropped in addition to the alternate selection. Thus, with a subset SDS of precisely sixty-four samples the process proceeds from the junction 110.

With the subset SDS of precisely 64 digitized samples DS, the next phase of the process is performed by the processor 92 (FIG. 7) to accomplish an offset selection. In that regard, many of the initial and final digitized samples DS are dropped from the space of pulses 52 and 54, FIG. 4C) leaving digitized samples DS taken from the relatively stable (central) portion 56 of the analog signal AS. Thus, the interspersed portion of the sample section is selected representing the magnetized region 42 (FIG. 4A) as explained above.

Figure 6E:
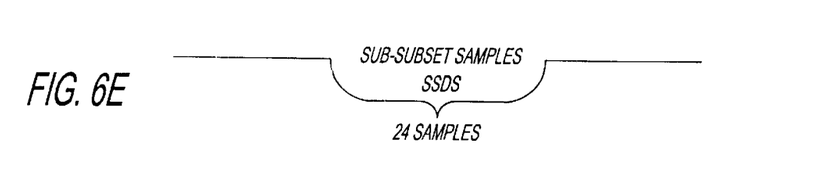

The operation of the offset processor 92 may be relatively simple as represented by a block 128 in FIG. 8. Specifically, a central sub-subset SSDS of digitized samples DS, e.g. twenty-four is selected as indicated in FIG. 6E. For example, the selected digitized samples DS might be the twenty-four central (interspersed) samples from the subset of sixty-four.

With the accomplishment of a sub-subset (twenty-four samples SSDS) the process proceeds to a query block 130 (FIG. 8) representing the step of determining whether all eight sets GDS have been processed. When the last of the eight sets is complete, the process proceeds to assemble the final magnetic characteristic identifier MI in the storage 95 (FIG. 7). The step is indicated by a block 132 in FIG. 8. However, if the completed selection process is not the last of six, the operation returns by a path 134 to the block 106 cycling to process the next set GDS.

It will be understood that the process of developing the magnetic characteristic identifier MI is performed preliminarily with respect to each card 10 placed in service. As indicated above, the identifier so formed is designated as a reference magnetic identifier RMI which is stored in a central databank (not separately illustrated) for use in the correlation operation. Representations of the reference identifier RMI are supplied from the unit 26 (FIG. 1) to the correlation circuit 24.

Figure 8A:
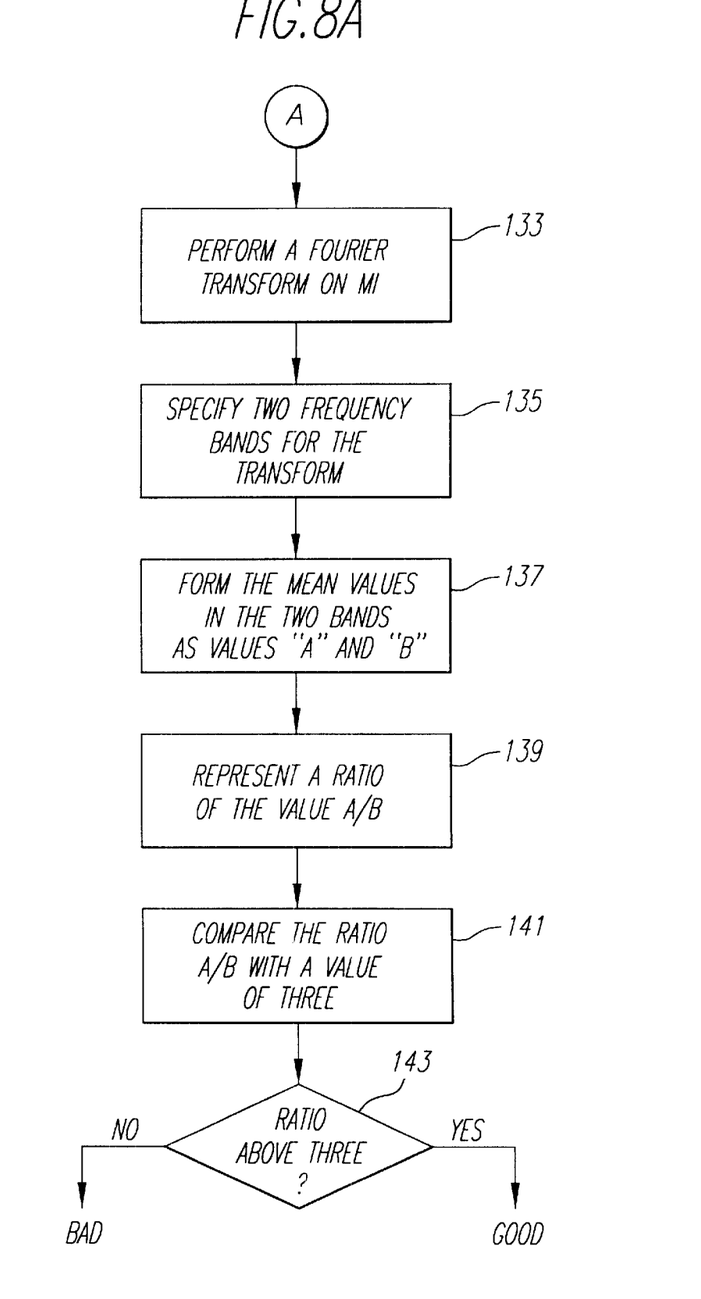
FIG. 8A is a continuation of FIG. 8 showing an extension of the flow diagram.

Recapitulating, with the presentation of the card 10, The operation of the correlation circuit 24 depends on the presence of a "GOOD" signal from the signaling unit 27. In that regard, the sensed magnetic signal SMI is processed to determine a measure of the quality of sensing. Accordingly, the process proceeds from the block 132 (FIG. 8 bottom right) indicating the identifier MI is complete and is continued as illustrated in FIG. 8A. FIGS. 8 and 8A thus are indicated to be linked by an encircled letter "A".

Upon receiving the representative signal MI, the quality-of-read test unit 25 performs a Fourier transform on the identifier MI which represents waveform fragments of the analog signal AS. Structures for executing Fourier transforms on digitized waveforms are well known and available for use in the unit 25. The process step is illustrated by a block 133 in FIG. 8A.

A representation of the Fourier transform is provided to the signaling unit 27 indicating the harmonic content of the identifier MI, e.g., harmonic content over a range of frequency. The signaling unit 27 specifies two frequency bands (block 135) and determines the mean values of indications in each of the two bands A and B (block 137). Additionally, the unit performs an arithmetic function. Specifically, the two mean band values A and B are combined as a ratio, e.g., A/B (block 139) and the result is compared with a fixed value, e.g., "3" (block 141). In one embodiment, the ratio of a low frequency band value A to a high frequency band value B indicates a "GOOD" sensing if over a value of "3". Using such an example, if the ratio A/B exceeds "3" a "GOOD" indication is provided (block 143), otherwise the indication is "BAD". Of course, a "GOOD" signal activates or conditions the correlation circuit 24 to proceed with a verified identifier SMI. After authentication, which involves using the freshly sensed magnetic characteristic identifier SMI as explained above, the identifier is accepted from the forming circuit 22 (FIG. 1) by the correlation unit 24. Thus, as indicated above, the degree of correlation between the reference and sensed identifiers (SMI and RMI) indicates the authenticity of the card.

In summary, in accordance with the present development, sampling, under control of a frequency lock loop, targets a set of a predetermined number of samples. Two selection steps then attain a precise number of samples from the magnetized region.

As indicated, digitized samples DS of two bits appear to be satisfactory and in one operating embodiment, a set of one hundred twenty-eight samples was reduced by Nth number selection (every second) and offset selection to attain twenty-four samples for each sampled section. A group of eight sub-subsets were then composed as the magnetic characteristic identifier MI. The quality of sensing is tested as a condition to proceeding.

Although the techniques and structures treated above have been determined to provide reliable operation while allowing considerable flexibility among individual cards and processing systems, a related problem was recognized in relation to the magnetic sensing structures. Specifically, in accordance herewith a non-conventional sensing unit has been determined to be significant for improved reliability in an extensive system.

Generally, prior proposals for utilizing magnetic stripe characteristics to authenticate cards have been rather indifferent regarding certain properties of the magnetic sensing unit. However, to some extent, aspects of the present development are based on recognizing the need for certain structural arrangements regarding the sensing unit. In that regard, initially consider the symbolic representation of a magnetic sensing head as shown in FIG. 9.

Figure 9:
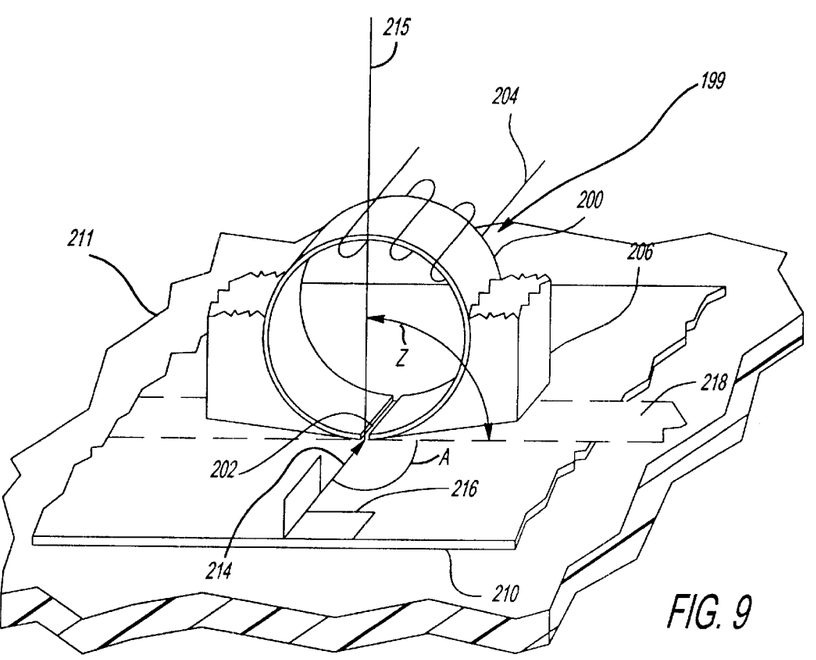
FIG. 9 is a perspective and diagrammatic view illustrative of a sensing device, as for use in accordance herewith.

Typically, an inductive magnetic transducer head 199 is represented in FIG. 9 comprising a core 200 of magnetic material defining an open or non-magnetic gap 202. A coil 204 is inductively linked to the core 200, the combination being mounted in a support structure 206. Often, the support structure 206 takes the form of a plastic block in which the core 200 and the coil 204 are imbedded.

In FIG. 9, the head 199 is illustrated adjacent to a magnetic stripe 210 (fragmentarily shown) carried on a rather stiff or inflexible card 211 (also fragmentarily shown). Basically, as the stripe 210 moves relative to the head 199, magnetic variations at the gap 202 are sensed in the form of an analog signal in the coil 204. Thus, data as well as characteristic magnetic density variations or anomalies (noise) are sensed as the analog signal AS as treated above.

As generally contemplated, extensive commercial and industrial systems involve a multitude of magnetic stripe cards used in conjunction with many different transaction units to perform processes as explained above. In accordance herewith, several features or specifications have been determined to be very important to attain the requisite reliability for many applications of the present system utilizing traditional magstripe cards. To explain these requirements, certain aspects will be treated individually.

As shown in FIG. 9, the non-magnetic gap 202 defines a plane 214 indicated by an arrow and a perpendicular line 215. An angle between the plane 214 and the plane of the stripe 210 is designated A and traditionally deviations from a ninety degree angle are termed azimuth. In accordance with an aspect hereof, such deviations are to be limited to less than one degree. Specifically, it has been determined that deviations from the right angle relationship azimuth should be held to less than 0.05 degrees. As another criteria, the product of the azimuth deviation in degrees and the width of the head read channel in inches shall be less than 0.02.

Another consideration involving the relationship of the head 199 to the stripe 210 is the position of the traversed path 218. Specifically, a path 218 of the head 199 is indicated by dashed lines with respect to the stripe 210. In accordance herewith, it has been determined that the location of the path should not vary more than ten percent of the width of the region sensed. Thus, offset between readers should be less than ten percent.

Another somewhat critical angle is termed zenith and constitutes deviations from the indicated angle Z being ninety degrees. In accordance herewith deviation between sensors should be limited to less than three degrees.

Figure 10:
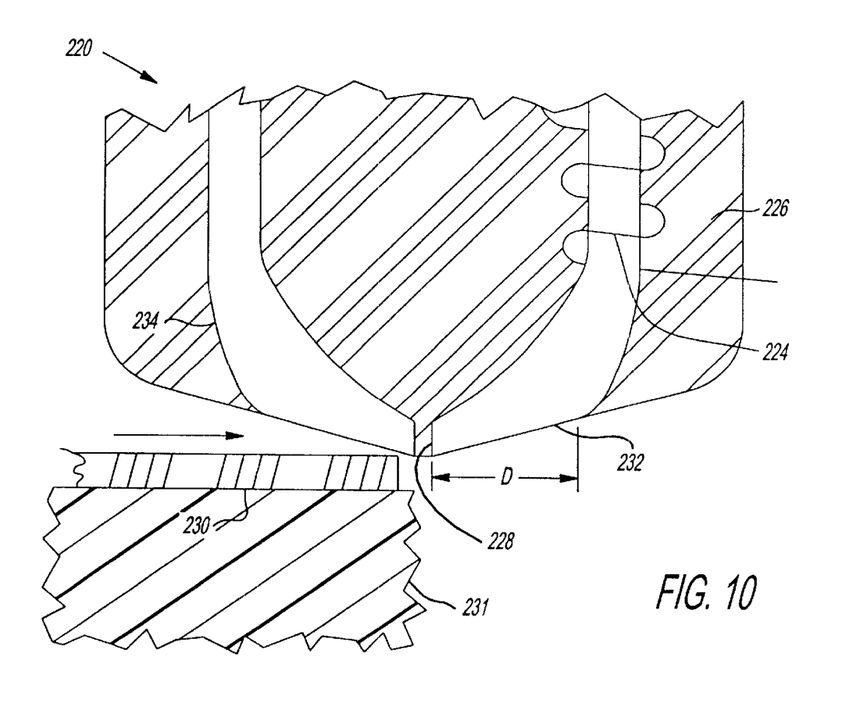
FIG. 10 is a fragmentary sectional view of a sensing device in accordance herewith.

Over the years, magnetic transducer heads have taken on a variety of shapes and configurations. An illustrative head structure 220 for use in systems hereof includes a core 222 bearing a coil 224 (symbolically represented) and mounted in a block 226. As illustrated in FIG. 10, the core 222 defines a non-magnetic gap 228 which traverses a magnetic stripe 230 on a card 231. It is significant that the core 222 does not present any ridges perpendicular to and in the vicinity of the stripe 230 which would be generally parallel to the plane of the gap 228. In that regard, so-called contour effects have long been recognized. Specifically, see a book entitled Magnetic Recording Techniques, 1958, pages 70–73. One solution to undesired contour effects has been to wrap the record medium about the read structure. However, magnetic stripe cards are not sufficiently flexible for such a solution. Based on that and related contour realizations, in accordance herewith, an infinite length pole is to be pursued. Specifically, the distance D with the pole surface coinciding to the can or block 226 should approximate at least one inch. Thus from the gap 228, the surface 232 of the core 222 smoothly tapers away from the gap 228. Accordingly, spurious induced signals are significantly reduced enabling improved accuracy in sensing the desired magnetic characteristic features.

In view of the above explanation of exemplary systems, it will be appreciated that other embodiments of the present invention may be employed in different applications to verify, authenticate, identify or confirm documents, particularly magnetic stripe bearing cards. While exemplary operations have been stated herein and certain detail structures have been disclosed, the appropriate scope hereof is deemed to be in accordance with the claims as set forth below.

What is claimed is:

1. An identification system for identifying documents bearing a magnetic stripe recorded with digital data and having a repeatable magnetic characteristic, comprising:
    a magnetic stripe sensor apparatus for sensing a magnetic field of the magnetic stripe to provide an analog signal representative of said recorded digital data and a sensed representation of said repeatable magnetic characteristic;
    a quality-of-sense unit for testing an aspect of the analog signal to provide an approval signal for an adequate sensing by the magnetic stripe sensor;
    a source of reference representations of said repeatable magnetic characteristic;
    a correlation unit for correlating sensed representations of said repeatable magnetic characteristic with reference representations of said repeatable magnetic characteristic conditioned by said approval signal to thereby identify said documents.

2. An identifier system according to claim 1 wherein said quality-of-sense unit comprises an apparatus for testing a harmonic content of predetermined frequency bands from said analog signal.

3. An identifier system according to claim 1 wherein said quality-of-sense unit comprises an apparatus for executing a Fourier transform on an aspect of said analog signal.

4. An identifier system according to claim 1 wherein said quality-of-sense unit comprises an apparatus for testing the energy levels of predetermined frequency bands from said analog signal.

5. An identification system according to claim 1 wherein said magnetic stripe is recorded with a plurality of zeros and said sensed representation of said repeatable magnetic characteristic is taken from portions of said analog signal representing said zeros.

6. An identification system according to claim 1 wherein said magnetic stripe is recorded with digital data represented by magnetic transitions and said sensed representation of said repeatable magnetic characteristic is taken from at least one portion of said analog signal representing spaces between said magnetic transitions.

7. An identification system according to claim 6 wherein said aspect of the analog signal comprises said sensed representation of said repeatable magnetic characteristic.

8. An identifier system according to claim 6 wherein said quality-of-sense unit comprises an apparatus for testing the harmonic content of predetermined frequency bands from said analog signal.

9. An identification system according to claim 1 wherein said analog signal is digitized to provide said aspect thereof.

10. An identification system according to claim 9 wherein said magnetic stripe is recorded with digital data represented by magnetic transitions and said sensed representation of said repeatable magnetic characteristic is taken from at least one portion of said analog signal representing spaces between said magnetic transitions.

11. An identification system according to claim 1 wherein said magnetic stripe sensor senses said representation of said repeatable magnetic characteristic from at least one portion of said analog signal representing spaces between magnetic transitions.

12. An identification system according to claim 11 wherein said quality-of-sense unit comprises an apparatus for testing the harmonic content of predetermined frequency bands from said analog signal.

13. An identification system according to claim 1 further including a display unit for instructing a re-sensing of the document conditioned upon the absence of said approval signal.

14. An identification system according to claim 1 wherein said magnetic stripe sensor apparatus includes a transducer head including a magnetic core defining a non-magnetic gap for positioning generally perpendicular to said magnetic stripe, said core defined to avoid contour effect.

15. A magnetic transducer head for use in an identification system for documents bearing a magnetic stripe, the magnetic stripe having a magnetic characteristic that can be repeatedly sensed as a repeatable magnetic characteristic signal, said magnetic transducer head comprising:
    a magnetic core defining a non-magnetic gap for positioning generally perpendicular to said magnetic stripe, said core defining uninterrupted continuous surfaces extending substantially away from said non-magnetic gap;
    a winding inductively coupled to said core; and
    a mount for supporting said core adjacent to a path for said magnetic stripes on documents.

16. A system for use with a card bearing a magnetic stripe having a repeatable magnetic characteristic and recorded with digital data in the form of magnetic transitions, said system for providing a sensed characteristic identification for the card, comprising:
    means for sensing said magnetic stripe to provide representations of digitally recorded data and representations of said repeatable magnetic characteristic in the form of at least one set of digital sample signals of a target number and including digital sample signals sensed from a location between said magnetic transitions;
    a quality-of-sense unit for testing an aspect of said representations sensed from said magnetic stripe to provide indications of acceptability;
    means for selecting a subset of said at least one set of digital sample signals, said subset including a predetermined number of said digital samples sensed from a location between said magnetic transitions; and
    means conditioned by said quality-of-sense unit for storing at least said subset of said at least one set of digital sample signals as an identifier to identify said card.

17. A process for identifying documents bearing a magnetic stripe having a distinct magnetic characteristic that is capable of repeated sensing to identify individual documents, said process including the steps of:
    sensing the magnetic stripe to produce a representative analog signal manifesting the distinct magnetic characteristic;
    testing an aspect of said analog signal to indicate the quality-of-sensing from the stripe; and
    subject to the result of said testing, utilizing a representation of the distinct magnetic characteristic from said representative analog signal to identify a document.

18. A process according to claim 17 further including a step of defining at least one select portion of the analog signal to provide said representation of the distinct magnetic characteristic.

19. A process according to claim 18 wherein said magnetic stripe is recorded with digital data represented by magnetic transitions and said select portion of the analog signal is between said magnetic transitions.

20. A process according to claim 18 wherein said aspect of said analog signal includes said select portion of the analog signal.

21. A process according to claim 17 including the further steps to form said representation of the distinct magnetic characteristic of:

defining at least one portion of the analog signal;

dividing the portion of the analog signal into a target number of sample times;

sampling the analog signal at the sample times to produce a target number of samples and digitizing the resulting samples;

reducing the target number of samples to a predetermined number of samples to manifest a distinct magnetic characteristic for the document.

* * * * *

UNITED STATES PATENT AND TRADEMARK OFFICE
CERTIFICATE OF CORRECTION

PATENT NO. : 6,431,445 B1
DATED : August 13, 2002
INVENTOR(S) : Robert S. DeLand, Jr. et al.

It is certified that error appears in the above-identified patent and that said Letters Patent is hereby corrected as shown below:

<u>Title page,</u>
Item [75], Inventors, add -- Robert E. Morley, Jr., St. Louis, MO (US) --.

Signed and Sealed this

First Day of November, 2005

JON W. DUDAS
*Director of the United States Patent and Trademark Office*